Sept. 15, 1959     P. ROBINSON ET AL     2,904,618
SEALED HOUSING AND INDEXING MEANS FOR ELECTRICAL COMPONENTS
Filed July 30, 1956

PRESTON ROBINSON
PAUL H. NETHERWOOD
INVENTORS

BY *Connolly and Hutz*

THEIR ATTORNEYS

United States Patent Office 2,904,618
Patented Sept. 15, 1959

2,904,618

SEALED HOUSING AND INDEXING MEANS FOR ELECTRICAL COMPONENTS

Preston Robinson and Paul H. Netherwood, Williamstown, Mass., assignors to Sprague Electric Company, North Adams, Mass., a corporation of Massachusetts Application July 30, 1956, Serial No. 600,776

2 Claims. (Cl. 174—52)

This invention relates to improved seals and more specifically refers to resin end-seals particularly suited for use in the electrical component field. The application is filed as a continuation-in-part of our co-pending application, Serial No. 247,306, filed September 19, 1951, now abandoned.

One form of the invention relates to end seals for electrical capacitors, resistors, transformers and the like. In the past electrical components, for example capacitors, have been housed in wax coated cardboard tubes, in molded or cast resin casings, and in metal containers of one type or another.

The wax dipped type are inexpensive but the wax coating is relatively fragile and cracking or chipping of the wax coating will result in lowered humidity resistance. Further, wax coated housings are not suited to high temperature operation due to limitations in the melting point of tough waxes. Accordingly, for applications in which durability, high humidity resistance and/or high temperatures are to be met, resin cased or metal cased capacitors are ordinarily employed.

The resin cased capacitors heretofore have been limited in temperature range by the differential expansion of the casing and insert and by the stability of the resin; in humidity resistance, by the nature of the resin, the adherence of the resin to the terminal elements, etc.

The metal cased capacitors, particularly those with glass-to-metal seals, are very satisfactory over a fairly wide temperature range, but suffer from at least two disadvantages. First, the cost for the seal per se and for the assembly labor is quite high; and second, limitations in easily worked solders prevent subjection of the unit to even occasional periods of very high temperatures, in that the solder will melt and the seal will rupture.

It is an object of the present invention to overcome the foregoing and related disadvantages. A further object is to produce new and improved resin end-seals. A still further object is to produce resin masses which are thermally stable, adherent to metal and resin casings and which possess temperature coefficients of expansion comparable to those of the metal and resin casings. These and other objects of this invention will become apparent from the following description and claims and by reference to the appended drawing.

These objects are attained in accordance with the invention wherein there is produced an insulation for an electrical device comprising a mixture of particles of an inert filler material and a resin conforming to the general formula

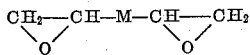

where M represents a bivalent organic radical containing at least three carbon atoms, reacted with a compound conforming to the general formula

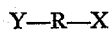

wherein Y is selected from the class of hydrogen —COOH, —OH and —NH$_2$ groups; X is selected from the class of —COOH, —OH and —NH$_2$ groups; and R represents a bivalent organic radical.

The invention is also concerned with the treatment of the massive insulation or preferably the surface of the insulation to react hydroxy groups in a manner such as to produce a resin with optimum water repellency.

In its limited embodiments the invention is concerned with electrical devices sealed by the use of insulation of the type described above. The basic resins used in accordance with this present invention comprise those having in the intermediate stage at least one and preferably two or more epoxy groups per molecule. These intermediates are readily produced usually through condensation of epichlorohydrin with compounds such as bisphenol and diphenylol propane. The general formula is the following:

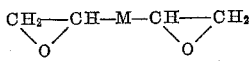

wherein M can be bivalent organic radical such as a straight or branched chain radical or in the case of bisphenol condensation products may be a radical containing two phenyl nuclei joined to each other by an aliphatic hydrocarbon group and to the epoxy group through an ether linkage.

The conversion of these intermediates into the desired form can be accomplished through use of carboxylic acids, alcohols and/or amines. Typical acids are adipic acid and stearic acid, poly basic acids being preferred. Long chain acids such as stearic acid improve the water repellency. Typical alcohols are octyl alcohol, ethylene glycol, and glycerine. Suitable amines include dodecyl amine, beta naphthylamine, diethylene triamine, meta phenylene diamine, etc. The percentage of these compounds used to effect the appropriate condensation may be varied from theoretical down to amounts just sufficient to cross link or react enough epoxy molecules to obtain the desired resin form.

For this purpose it is understood that reactive polyesters, polyamides, and polyurethanes, can be used in whole or to supplement the action of the cross linking agent. It is of course necessary that these latter resins possess appropriate reactive groups.

An organic isocyanate or polyisocyanate can be used to cross-link or after treat a cross-linked resin. For a massive treatment we employ a thermally unstable reacted isocyanate (such as methyl alcohol with hexamethylene diisocyanate) which will give the active isocyanate upon heating to elevated temperatures. According to a limited embodiment we treat the surface of condensed resin seals with an organic isocyanate, reacting any exposed hydroxy groups to further improve the water repellency. Suitable isocyanates include phenyl isocyanate, hexamethylene diisocyanate and meta tolylene diisocyanate.

The fillers are inert materials, usually ground to particle size less than about 35 mesh. The preferred range of particle size is from about 100 mesh to about 325 mesh. Optimum results are obtained when substantial quantities of different mesh ranges are present, as, for example, 50% between 100 and 150 mesh, 25% between 150 and 200 mesh and 25% between 200 and 325 mesh. The range of filler concentration is usually from about 10 to about 80 parts by weight, based on the total weight of seal.

Organic fillers may be employed. These include polytetrafluoroethylene, polytrifluoromonochloroethylene, cotton, rayon, silicone polymers, polyacrylonitrile, vulcanized natural and synthetic rubbers, styrene-divinylbenzene thermoset copolymers, polydiallylphthalate, polyallylcarbonates, etc. It is essential that the softening point of such fillers per se, should they be thermoplastic in nature, is above the maximum temperature to which the resin seal will be subjected.

Inorganic fillers also may be used with success. Included in this group are mica, expanded mica and vermiculite, steatite, talc, zinc oxide, china clay, bentonite, whiting, etc. Where a high dielectric constant mass is desired, high dielectric constant fillers, such as titanium dioxide, the titanates of barium and strontium, selected zirconates etc., may be employed.

The preferred fillers of the invention are the low, zero and negative temperature coefficient ceramics, such as aluminum titanate, lithia alumina, silicate, etc. Through use of these fillers of selected properties and in selected concentration, it is possible to obtain resin seals of unusual and perfectly matched-to-container thermal characteristics, as well as other types of material seals. To ensure matching coefficients of expansion of the seal to that of the container, it is preferred to use as fillers for the seal of our invention, ground particles of the container material. If the container resin utilizes a large percentage of filler, the desired matching temperature coefficients can be obtained by employing the same filler in the seal material.

Through the use of this invention seals can be made to numerous common metals and alloys, such as copper, brass, zinc, tin, bronze, iron, aluminum, as well as the less commonly used materials such as nickel, cadmium, lead, tantalum, magnesium, etc.

An important feature of the invention is that seals may be made to materials such as ceramics, glasses and thermosetting resins. This feature is of great practical utility, since glass-to-metal, glass-to-ceramic, ceramic-to-metal, ceramic-to-ceramic, glass-to-glass and similar seals can be made without requiring the use of expensive sealing techniques, such as metalizing and soldering and/or without requiring high temperatures during the sealing steps.

For further detailed description of the utility of the seals of this invention in the electrical field reference may be made to the appended drawing in which.

Figure 1:
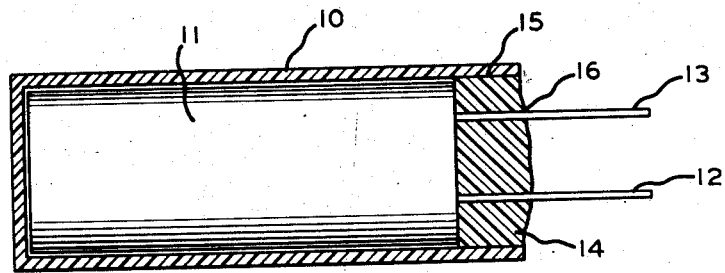
Figure 1 shows a simplified cross section of a housed electrical device.

Referring more specifically to Figure 1, 10 represents a plastic or metal can housing an electrical device 11 such as a capacitor which has terminal leads 12 and 13 protruding from the open mouth of can 10. Terminal seal 14 employs the resin of the invention, by virtue of which bonds are formed between resin 14 and terminal 13 as noted at 16, and between resin 14 and can 10 as noted at 15.

Can 10 is of tubular construction, preferably molded of a thermosetting resin in a single operation. By virtue of the unusual adhesion and dimension stability of the end seal of this invention, the inner wall of can 10 may be smooth faced and the open mouth of the can may be made without flanges or anchoring indentations of any kind. The seal of this invention makes practical the passage of both electrical leads of the encased component from one end of the container, in that our endseals are capable of providing an effective moisture seal at the mouth of the container even though joints must be maintained throughout an extended temperature range between the smooth surfaced container wall and the seal, and between the component leads and the seal, notwithstanding that the containers are of the order of only one-half inch in diameter.

As a typical example of the formation of seal 14 in accordance with the invention, 50 parts of the diglycidyl ether of bisphenol is thoroughly mixed with 100 parts of aluminum titanate whose particle size falls between 100 mesh and 325 mesh. After thoroughly mixing, 8 parts of diethylene triamine is added to the mix and thoroughly incorporated therein. The pasty mass is introduced into a capacitor housing and cured by heating for three hours at 60° C. followed by six hours at 150° C. Optimum water repellency is achieved by dipping the cured resin in phenyl isocyanate for 10 minutes followed by baking at 80° C. for two hours.

Figure 2:
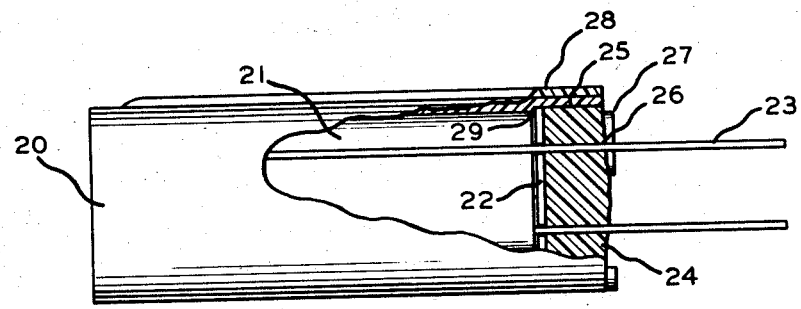
Figure 2 shows a modified molded container partly in section.

The seal material thus formulated may be introduced in the open mouth of the container in paste form by means of injection or by a spatula, or the seal material may be formed into pellets and pressed into position. In any event it is preferred to in situ cure the seal.

Where it is desired to ensure accurate positioning and separation of the component leads as for components to be mounted by automated processes, a disc of dielectric material having prepunched lead wire holes and indexing means may be inserted into the mouth of the casing prior to introduction of the seal material. In Figure 2 a tubular container 20 of molded plastic, e.g. phenol formaldehyde, has an external indexing ridge 28 so related to mounting lugs or feet 27 that proper mounting in an automatize circuit is ensured. The electrical component 21 is shown as having a lead extending from each end, however, since it is desirable for automation to have both leads extend from the same end, lead 23 is doubled back on the unit 21 and is kept spaced from the other lead by spacer 22 which is supported on a pair of ledges 29 molded in container 20. Spacer 22 is provided with passageways for the leads and may also be provided with indexing means, such as notches to mate with bosses on ledges 29 to ensure proper and consistent relationship between one of the leads and external index 28. The seal material 24 is introduced into the cavity above spacer 22 and is in situ cured in the manner set forth in the description of Figure 1 to ensure bond 25 to the inside of the wall of container 20, and bond 26 to the lead wires.

Figure 3:
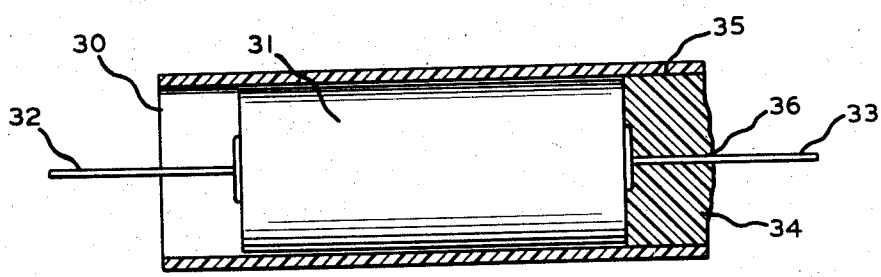
Figure 3 shows a further modification of the container.

Another process for assembly is utilized when an end cap of the same or compatible material as the container and which snap fits into the smooth walled mouth of the container is substituted for spacer 22. The end cap has the lead spacing and indexing means of spacer 22 and in addition may contain the mounting lugs 27. When this cap or plug is used, the seal material is inserted into the bottom of the empty container 20, then the unit 21 is inserted, and then the cap placed in properly oriented position within container 20. The entire unit is then inverted and heat applied to cure the resin seal. The heat causes the seal material to flow to seal around the cap or plug member and ensures not only a moisture proof seal, but also a smooth even exterior of a single material.

Where double ended tubular units of small diameter, e.g. ½ inch or less, are constructed with the end seal of this invention the assemblage shown in Figure 3 may be employed. In Figure 3, 30 is an open ended tube preferably extruded in long lengths and cut to fit the component 31 to be encased. Axially aligned leads 32 and 33 which are attached to the ends of component 31 extend beyond the ends of tube 30. Suitable space is provided at each end of unit 31 to permit the introduction of our end seal material. Only one end is shown as having a seal 34 in order that the smooth wall of tube 30 may be emphasized. End seal 34 provides bond 35 to tube 30, and bond 36 to lead 33. With our end seal there is no need for flanges or indentations frequently used to aid in securely fixing end seals in position. Tube 30 may be of extruded polyethylene terephthalate or similar resins. A modification of this embodiment of our invention involves wrapping components in plastic tape of such width as to provide cups at each end of the component for the introduction of our end seal. This provides a unit very similar in appearance to the unit of Figure 3 and for many uses provides a simpler method of encasing double ended units. The tape may be of electrical quality plastics, e.g. polyethylene terephthalate.

As many widely and different embodiments of this invention may be made without departing from the spirit and scope hereof, it is to be understood that the invention is not limited to the specific embodiments hereof except as defined in the appended claims.

What is claimed is:

1. A sealed electrical capacitor comprising a generally cylindrical can of molded thermoset resin having one open end, a capacitance section mounted within said resin can and having a plurality of terminal leads extending through said open end, a spacer member provided with passageways and with indexing means related to said passageways, said spacer member mounted within said open end of said resin can and with said terminal leads extending through said passageways, an in situ cured epoxy resin end-seal filling said open end of said resin can above said spacer member, said end-seal containing at least 50% by weight of ground particles of the resin material of said resin can.

2. The capacitor of claim 1 wherein said resin can is provided with an external indexing means, and wherein said indexing means on said spacer member is located in predetermined relation to said external indexing means.

References Cited in the file of this patent

UNITED STATES PATENTS

| | | |
|---|---|---|
| 2,500,600 | Bradley | Mar. 14, 1950 |
| 2,501,868 | Hodgdon | Mar. 28, 1950 |
| 2,528,934 | Wiles | Nov. 7, 1950 |
| 2,582,985 | Greenlee | Jan. 22, 1952 |
| 2,596,134 | Dorst | May 13, 1952 |
| 2,636,073 | Clarke | Apr. 21, 1953 |